Nov. 15, 1932.     J. H. PETERSON     1,888,092
BRAKE MECHANISM
Filed Feb. 16, 1931     2 Sheets-Sheet 1

Inventor
J. H. Peterson
By Arthur H. Sturges
Attorney

Nov. 15, 1932.  J. H. PETERSON  1,888,092
BRAKE MECHANISM
Filed Feb. 16, 1931   2 Sheets-Sheet 2

Inventor
J. H. Peterson
By Arthur H. Sturges
Attorney

Patented Nov. 15, 1932

1,888,092

UNITED STATES PATENT OFFICE

JOHN H. PETERSON, OF SILVER CITY, IOWA, ASSIGNOR OF THIRTY-FIVE PER CENT TO ELMER G. GREEN, OF SILVER CITY, IOWA

BRAKE MECHANISM

Application filed February 16, 1931. Serial No. 516,105.

The present invention relates to hydraulic brakes adapted for application to vehicles and the like, and has for an object to provide certain improvements over the construction shown and disclosed in my prior Patent No. 1,788,690 granted January 13th, 1931 entitled Hydraulic brake for vehicles.

A further object of the present invention is to provide safety means for a multiple brake control system wherein upon failure of one or more of the independent braking units incident to leakage of the oil or other fluid medium employed, the remaining braking elements may properly function so that the entire brake system will not fail.

A further object of the invention is to provide a supply and controlling unit which is of relatively small, compact and durable construction for mounting upon the chassis or body of a vehicle and adapted to be connected and used in a braking system or device such as illustrated in my above referred to patent or which may be used in connection with any other type of braking mechanism having individual braking units controlled either directly or indirectly by fluid pressure.

The invention still further aims at the provision of a supply and control unit for a hydraulic brake unit wherein the unit has a general supply reservoir and a plurality of independent reservoirs or containers communicating with the main reservoir, one individual container for each braking unit, the containers being independently in communication with the braking units so that upon the exhaustion of fluid from one braking unit and its container, the fluid will not escape from the other independent containers and thus will maintain the remaining braking units for operation.

A still further object of the invention is to provide a novel equalizing or compensating structure for transmitting pressure between the arm operable by the brake pedal to the various pressure transmitting devices which are independently mounted in the supply and control unit.

With the foregoing and other objects in view, the invention will be more fully described hereinafter, and will be more particularly pointed out in the claim appended hereto.

In the drawings, wherein like symbols refer to like or corresponding parts throughout the several views.

Figures 1, 2:
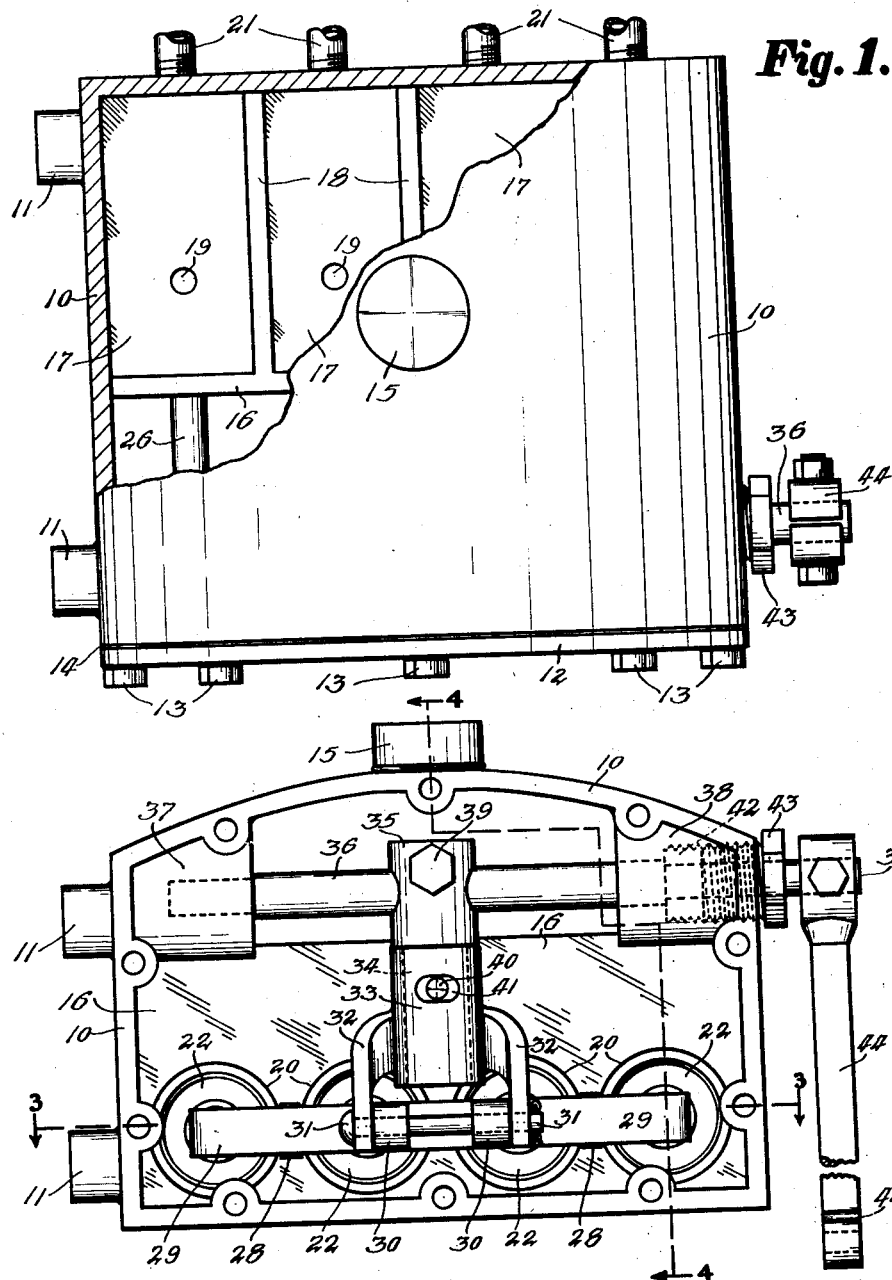
Figure 1 is a top plan view of a combined supply and control unit, partly broken away.
Figure 2 is a rear end elevation of the same with the rear cover plate removed.

Referring now to the drawings, 10 designates a casing of substantially rectangular configuration and which may be provided at any suitable convenient points with bosses or projections 11 by means of which the casing may be mounted in the chassis or body of a motor vehicle.

The casing 10 is closed at all sides with the exception of its rear end, and this is closed by the removal plate 12 secured by cap screws 13 or the like and which is sealed in place by a gasket 14. The various parts are so constructed that they may be withdrawn and adjusted through the rear end of the casing 10 when the closure plate 11 is removed.

Figure 4:
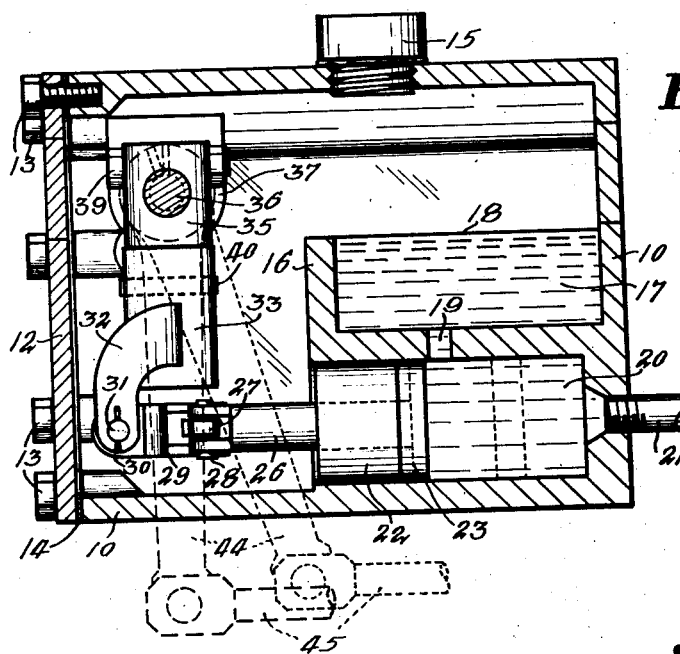
Figure 4 is a vertical section taken through the control unit substantially on the line 4—4 of Figure 2.
Figure 5:
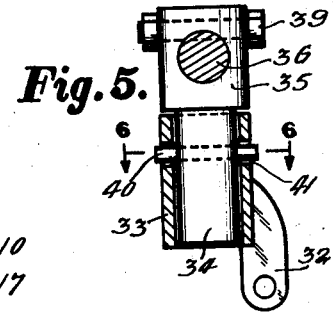
Figure 5 is a detail sectional view taken through the pressure applying rocker arm of the unit.
Figure 6:
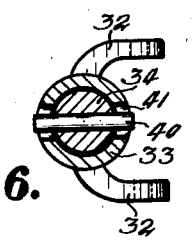
Figure 6 is a horizontal section taken through the same substantially on the line 6—6 of Figure 5.

A removable screw block 15 is threaded through the top of the casing 10 and is adapted to be removed for filling or replenishing the casing with oil or other suitable fluid medium which may be used in the brake system. The lower part of the casing 10 is divided by a transverse partition wall 16 which extends upwardly to a desired extent, such as shown in Figures 2 and 4, a distance slightly greater than one-half the height of the casing 10, the partition wall 16 extending to the bottom of the casing and adapted to entrap oil in the forward end of the casing, as shown in Figure 4.

The forward end compartment of the casing is sub-divided into a number of containers 17 by means of partition walls 18 which extend longitudinally and in parallel relation between the front wall of the casing 10 and the transverse partition 16, as clearly shown in Figure 1. The containers 17 are relatively shallow as compared with the depth of the wall 16 and are provided in their bottoms with openings 19 which lead from the bottoms of the containers 17 into corresponding cylinders 20 which are formed in the lower part of the body of the casing 10 beneath the respective containers 17, and which open through the lower part of the partition 16. There is a cylinder 20 for each container 17 and fluid entrapped in the container 17 is adapted to flow through the opening 19 into the respective cylinder 20 for supplying the fluid thereto. Each cylinder 20 communicates at its forward end with an independent fluid supply pipe 21. The supply pipes 21 lead to independent braking units of any usual construction, and which are adapted for use with a unit such as is disclosed in my prior patent above referred to.

Figure 3:
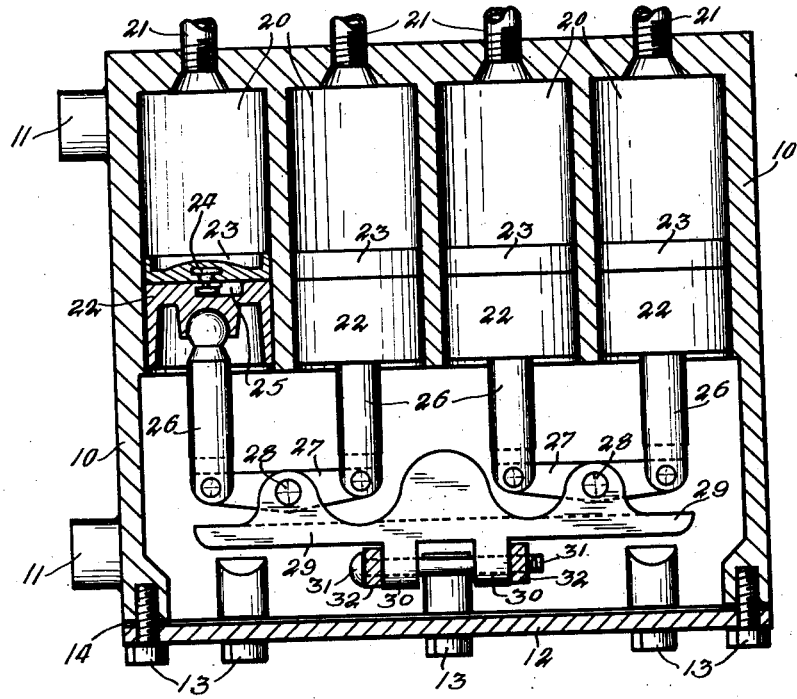
Figure 3 is a horizontal section taken through the control unit substantially on the line 3—3 of Figure 2.

A piston 22 is fitted in each cylinder 20 and, as shown in Figure 3, is provided with a packing cup 23 on its inner end which may be secured to the piston 22 by a head stud 24, the latter being interlocked with the piston 22 by the construction of a slotted aperture 25 provided in the outer face of the piston 22.

The piston 22 carries a connecting rod 26 preferably connected to the piston by a ball and socket joint as shown, and the outer or rear ends of the connecting rods 26 are connected pivotally in pairs with equalizing levers 27, one for each pair.

The present device is adapted for use in braking systems wherein four independent braking units are employed and thus four cylinders 20 are provided with their corresponding pistons 22 and connecting rods 26. The levers 27 are thus two in number and interconnect the adjacent connecting rods 26 into two pairs or groups, the equalizing levers 27 being pivotally connected intermediate their ends on pins 28 which are carried by an equalizing bar 29 which extends across and between the levers 27.

The equalizing bar 29 may be of any suitable configuration, but in the present instance is shown as being relatively flat and having its forward edge serrated to provide series of projections adapted to lie between the rear ends of the connecting rods 26 and for supporting the pivot pins 28 so as to give the desired strength to the parts and admit of a relatively short and compact structure.

The rear edge portion of the equalizing bar 29 is provided intermediate its ends with a pair of rearwardly extending apertured lugs 30 which carry a transverse pivot bolt 31 on which is pivotally supported a pair of lugs 32 which extend downwardly from the opposite sides of a sleeve 33 rotatably mounted upon the reduced shank 34 of a rocker member 35. The rocker member 35 is substantially T-shape with a horizontal shaft 36 mounted for rotation in bosses 37 and 38 carried in the upper rear portion of the casing 10 and which has intermediate its ends a removable block or body part 35 held in place by a transverse bolt 39 adapted to interlock the body part of the T-member with the transverse shaft 36. The sleeve 33 is held upon the shank 34 by a transverse pin 40 which not only engages through the shank 34 but also through slots 41 provided in the opposite sides of the sleeve 33 and which are circumferentially elongated to permit of a limited turning movement of the sleeve 33 to equalize the transmitted pressure through the equalizing bar 29.

The transverse shaft 36 is adapted to be introduced transversely into the casing 10 through one side thereof, and for this purpose the boss 38 is provided with an opening equal substantially to that of the diameter of the shaft 36 so that the latter may be introduced through the boss 38. The outer portion of the boss 38 is provided with a threaded packing cavity or box 42 in which is threaded a packing nut 43 which surrounds the outer reduced end of the shaft 36. The opposite end of the shaft 36 is reduced and fitted in a correspondingly reduced opening in the boss 37.

The outer exposed end of the shaft 36 is provided with a rocker arm 44 suitably secured thereto and which at its lower end is adapted for connection with a brake rod or the like, such as indicated in dotted lines in Figure 4 at 45. This brake rod 45 may extend to a brake pedal or other mechanism, such as disclosed in my prior patent above referred to.

The operation of the supply and controlling unit of the present invention, when coupled in a braking system having a plurality of braking units such as disclosed in my former Patent No. 1,788,690, above referred to, is substantially as follows:

The filler cap 15 is removed from the top of the casing 10 and the casing 10 is filled practically full of the fluid medium used in the braking system.

This fluid, such as oil, flows into the forward compartment of the casing 10 as the filler cap 15 is mounted in the top of the casing toward the forward end thereof as clearly shown in Figures 1 and 4.

The oil thus fills the various containers 17 and overflows the partition wall 16 as the oil level rises in the casing. This insures proper lubrication of the equalizing devices and the rocking member. The oil in each compartment 17 flows down through the adjacent opening 19 into the respective cylinder 20 and from the cylinder 20 through the respective pipe 21 to one of the braking units. When it is desired to apply the brake, the pedal or other operating means is moved into applied position to draw the brake bar 45 forwardly and swing the rocker arm 44 forwardly, such as shown in dotted lines in Figure 4. The movement of the arm 44 turns the shaft 36 to swing the body portion 35 of the rocker member and move its shank 34 forwardly with the result that the sleeve 33 swings forwardly with its lugs 32 and exerts a forward pressure upon the equalizing bar 29. Any inequality in pressure upon the opposite end portions of the equalizing bar is taken up through the sleeve 33 which is permitted to turn upon the shank 34 to a limited extent so that the shank 33 exerts a counterbalancing pressure upon the equalizing bar 29.

The forward movement of the equalizing bar 29 carries the equalizing levers 27 therewith, and the latter exert through their opposite end portions substantially equal pressure upon the connecting rods 26. This insures the simultaneous and uniform movement of the pistons 22 in all of the cylinders 20 so that as the pistons 22 move forwardly in their cylinders the entrapped fluid in the cylinders is forced outwardly through the pipes 21 to the individual braking units.

It will be noted from Figure 4 that when the piston 22 is in retracted position, or in normal position of rest when the brakes are unapplied, the opening 19 is uncovered so that the fluid in the container 17 may flow down into the adjacent cylinder 20. However, when the piston 22 moves forwardly a short distance it covers the opening 19 with the result that the oil or other fluid is entrapped in the forward end of the cylinder 20 and the oil cannot return to the container 17.

With this arrangement the various valves and their parts heretofore used in systems of this character, and which are disclosed in my above referred to patent, are completely done away with. There are less moving parts and the casing with the various structures mounted therein are condensed and interfitted in such manner as to provide a relatively small device embodying the necessary controlling characteristics.

It will be noted that the equalizing bar 29 is free to turn or twist to the necessary degree and also that the levers 29 are free to rock upon their pins 28 to take up any differences in the movements or positions of the pistons 22 which may be occasioned by differences in the amount of oil in the independent brake unit lines and by the seepage of oil incident to leaking connections or worn parts.

It is apparent however that when the rocker arm 44 is swung back into normal position, incident to the pressure exerted by the various pedal or brake rod springs employed, the rocker member 35 is swung back at its lower end and carries with it the equalizing bar 29 and its levers 27 so that the pistons 22 are all drawn backwardly beyond the openings 19 into normal position of rest, such as shown in full lines in Figure 4. Therefore, when there is leakage in any of the pipes 21 or the parts in communication therewith, the loss of the fluid is taken up by the flowing of a like quantity of the fluid downwardly through the adjacent opening 19 from the container 17 which lies directly above the cylinder.

Thus, when the casing 10 is filled with the fluid medium used to a surface level above the upper edge of the transverse partition 16, the various containers 17 are equally supplied with the fluid medium. When there is a breakage or a serious leakage in one of the brake unit lines, as the oil or fluid is exhausted from its cylinder 20 and pipe 21, the supply is replenished until the surface level of the fluid drops below the upper edge of the transverse partition 16. When this occurs, the depleted cylinder 20 may draw only upon its respective container 17 with the result that the faulty brake unit soon becomes inoperative and the operator of the vehicle soon becomes cognizant of this fact. However, the remaining braking units are maintained in operative condition because their respective containers 17 hold ample fluid for supplying their various cylinders 20 when there is no abnormal leakage in the independent braking unit lines.

Thus, before any danger or loss of control of the vehicle is experienced the operator becomes fully aware of a faulty braking unit and has at his control the remaining braking units which operate independently of one another. The independent feeding of the fluid beyond a certain surface level of the fluid in the casing takes care of the proper operation of the remaining brake units when one or several of them become inoperative and provides means whereby the casing may be replenished with the fluid after a repair is made and without altering the relation or adjustments of the other brake units.

It is obvious that various changes and modifications may be made in the details of construction and design of the above specifically described embodiment of this invention without departing from the spirit thereof, such changes and modifications being restricted only by the scope of the following claim:

What is claimed is:—

A combined supply and control unit for use in hydraulic vehicle brakes, comprising a casing, a plurality of containers in the casing, a cylinder disposed below each container and communicating therewith, a rocker member in the casing adapted to be swung for operating the vehicle brakes, a sleeve mounted to turn on the rocker member in position to be moved toward and from said cylinders, means for limiting the turning of said sleeve on the rocker member, equalizing means mounted on said sleeve to move therewith, pistons in said cylinders, and piston rods carried by the pistons and connected to said equalizing means whereby to equalize pressure of the rocker member equally and against said pistons, said limiting means for the sleeve adapted to hold the equalizing means in position to transmit said pressure to the remaining pistons when the fluid resistance fails with respect to other pistons.

In testimony whereof, I have affixed my signature.

JOHN H. PETERSON.